Sept. 10, 1963  C. A. RAFFERTY  3,103,328
LOAD LIMITER
Filed April 10, 1959  5 Sheets-Sheet 1

INVENTOR.
CHRISTOPHER A. RAFFERTY
BY
*SHHartz*
ATTORNEY

INVENTOR.
CHRISTOPHER A. RAFFERTY
BY
ATTORNEY

Sept. 10, 1963   C. A. RAFFERTY   3,103,328
LOAD LIMITER
Filed April 10, 1959   5 Sheets-Sheet 4

INVENTOR.
CHRISTOPHER A. RAFFERTY
BY
*S.H. Harty*
ATTORNEY

United States Patent Office 3,103,328
Patented Sept. 10, 1963

3,103,328
LOAD LIMITER
Christopher A. Rafferty, Palisade, N.J., assignor to The
Bendix Corporation, a corporation of Delaware
Filed Apr. 10, 1959, Ser. No. 805,488
30 Claims. (Cl. 244—76)

The invention relates to load limiters for aircraft for preventing dangerous accelerations of the craft. Load limiters as used heretofore responded to actual movement of the aircraft and the craft often attained destructive accelerations before the device functioned.

One object of the present invention is to provide a load limiter which functions in anticipation of dangerous acceleration of the craft even before the craft actually attains such acceleration.

Another object is to provide a load limiter which prevents dangerous acceleration of the craft by rendering the control surface driving means ineffective to operate the control surface.

Another object is to provide a load limiter which is highly responsive, simple in design and readily adapted to aircraft of modern design.

The invention contemplates a load limiter for aircraft having a control surface for controlling the craft about an axis, comprising driving means for operating the control surface, means for providing signals corresponding to movement of the control surface, and means responsive to the signals for rendering the driving means ineffective to operate the control surface when the signals attain a predetermined amplitude. The load limiter also may be controlled by signals corresponding to rate of turn of the craft about the axis and to signals corresponding to normal acceleration of the craft. In addition, the rate of turn signals may be varied as a function of airspeed. The signals corresponding to movement of the control surface may be signals from a rate generator or follow-up drivably connected to the control surface, signals controlling the driving means, signals from a pressure transducer responsive to pressure in a hydraulic ram, or signals from a rate gyro associated with the control surface. The signals may correspond to displacement rate or acceleration of the surface.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

Figure 1:
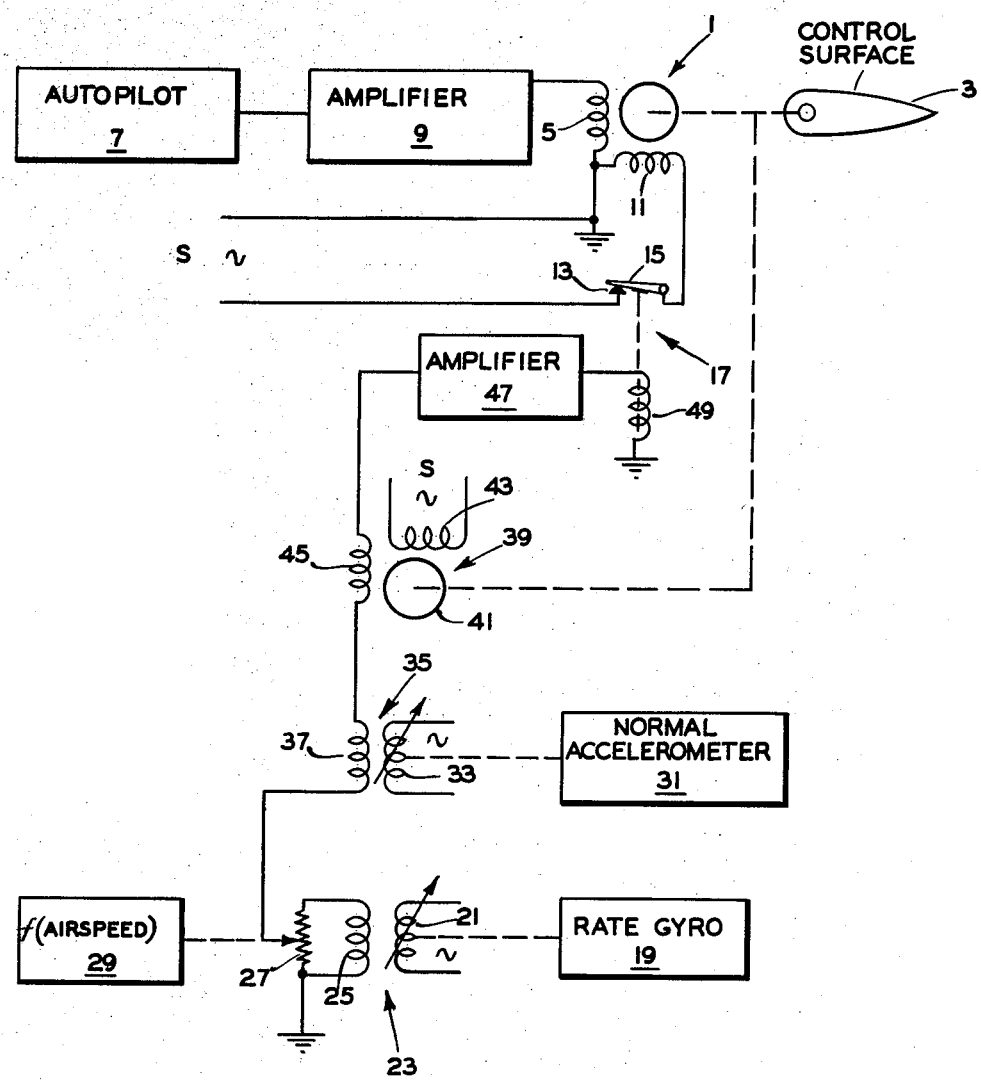
FIGURE 1 is a schematic diagram showing a load limiter constructed according to the invention.

Referring to FIGURE 1 of the drawings, an aircraft control system is shown therein as comprising a two-phase electric motor 1 drivably connected to an aircraft control surface 3 for controlling the craft about one axis. The variable phase 5 of motor 1 is energized by signals from an autopilot 7 through an amplifier 9. The fixed phase 11 of motor 1 is energized by an alternating current source S through normally closed contact 13 and armature 15 of a relay 17. Motor 1 operates control surface 3 in response to signals from autopilot 7 to maintain the craft on a fixed course or in a predetermined pitch attitude.

The novel limiter of the present invention prevents the craft from attaining destructive accelerations due to malfunctioning of the autopilot or other cause by operating relay 17 to disconnect the fixed phase of motor 11 from source S as described below.

A rate of turn gyro 19 is drivably connected to rotor 21 of an inductive signal generator 23 having its stator 25 connected across a potentiometer 27 controlled as a function of airspeed by device 29. Signals corresponding to rate of turn of the craft about the control axis modified as a function of airspeed, such as true airspeed or Mach number, are provided by potentiometer 27.

A normal accelerometer 31 operates the rotor 33 of an inductive device 35 having its stator 37 inductively coupled to the rotor. Inductive device 35 provides signals corresponding to acceleration of the craft normal to its velocity with respect to the air mass.

A rate generator 39 has its rotor 41 drivably connected to control surface 3 and has one winding 43 energized by alternating current source S. Rotation of rotor 41 induces a signal voltage in winding 45 corresponding to the rate of movement of control surface 3.

The rate of turn signal from potentiometer 27, the acceleration signal from inductive device 35 and the rate signal from generator 39 are added algebraically and applied to an amplifier 47 whose output energizes solenoid 49 of relay 17. When the output of amplifier 47 attains a predetermined amplitude sufficient to actuate relay 17, armature 15 disengages contact 13 to deenergize motor 1 in the manner described above. The signals corresponding to rate of movement of the control surface anticipate dangerous acceleration of the craft and motor 1 is rendered ineffective to operate the control surface before the craft attains dangerous acceleration.

Figure 2:
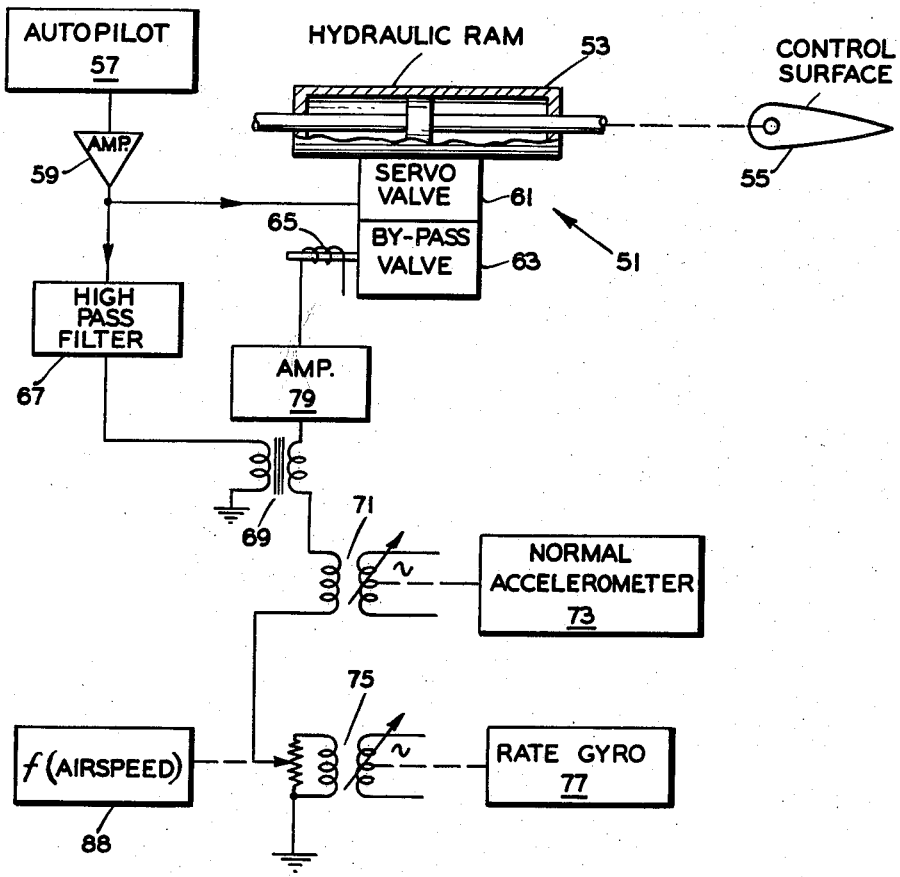
FIGURES 2, 3, 4 and 5 are schematic diagrams showing other embodiments of the invention.

In FIGURE 2, a load limiter constructed according to the invention is shown with a hydraulic servo 51 having a hydraulic ram 53 drivably connected to control surface 55. Signals from an autopilot 57 are amplified by an amplifier 59 and operate a servo valve 61 which controls hydraulic ram 53 to operate control surface 55 in response to the signals. Servo 51 has a by-pass valve 63 operated by a solenoid 65 which, when energized, renders hydraulic ram 53 ineffective to operate control surface 55. In this embodiment, signals from amplifier 59 which control servo valve 61, are applied to a high pass filter 67 which may derive the first or second derivative of the signal, that is, rate or acceleration of the surface servo. The filtered signals are fed to a transformer 69 or other suitable device to add the filtered signals to acceleration signals from inductive device 71 operated by normal accelerometer 73 and to rate of turn signals from inductive device 75 operated by rate of turn gyro 77 and modified as a function of airspeed by device 88. The signal sum is amplified by amplifier 79 and the output of the amplifier energizes solenoid 65 of by-pass valve 63. When the amplifier output attains a predetermined amplitude to operate by-pass valve 63, hydraulic ram 53 is rendered ineffective to operate control surface 55. The load limiter thus responds to signals corresponding to movement of the control surface and anticipates dangerous accelerations of the craft even before the craft attains such accelerations.

Figure 3:
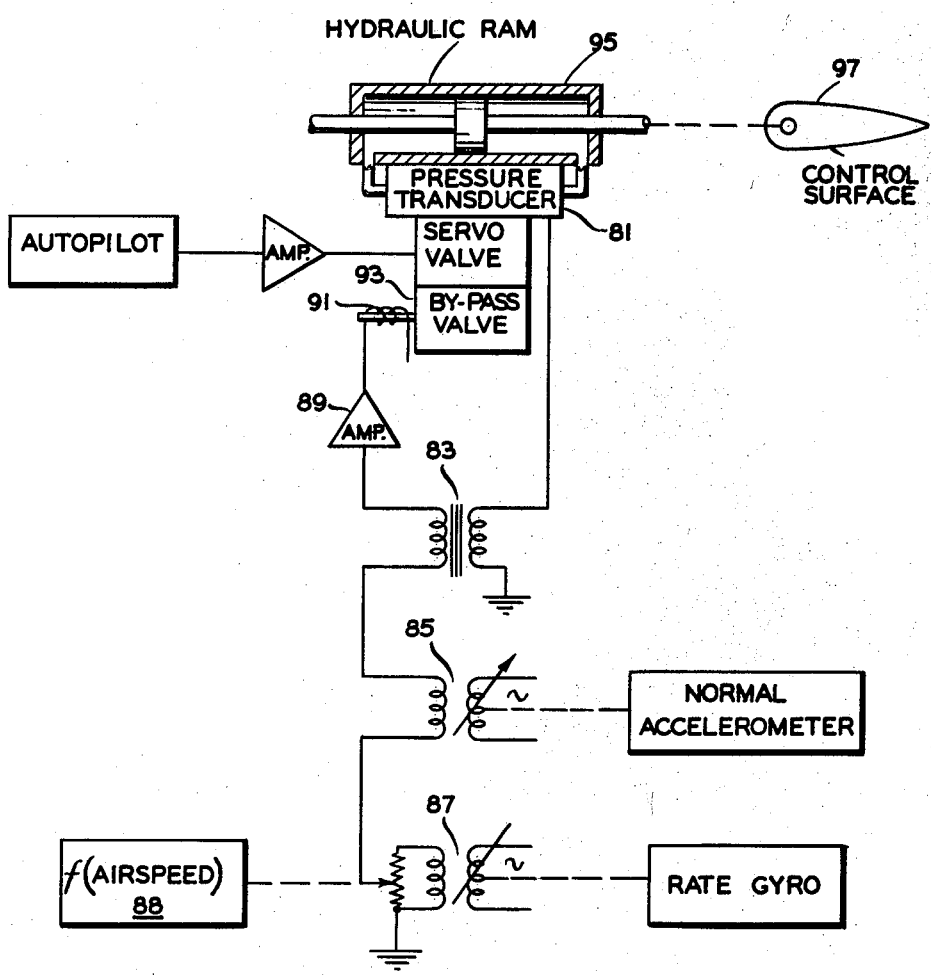

The arrangement in FIGURE 3 is similar to the arrangement shown in FIGURE 2 except that a pressure transducer 81 in the hydraulic servo provides anticipating signals corresponding to hydraulic pressure of the servo and these signals are applied to a transformer 83 for adding the signals to acceleration signals from inductive device 85 and rate of turn signals from inductive device 87. The signals are amplified by amplifier 89 and energize by-pass solenoid 91 to operate by-pass valve 93 to render hydraulic servo 95 ineffective to operate control surface 97 when the signal sum attains a predetermined amplitude. Movement of control surface 97 is determined by pressure in hydraulic ram 95 and pressure transducer 81 provides signals which anticipate dangerous accelerations of the craft.

Figure 4:
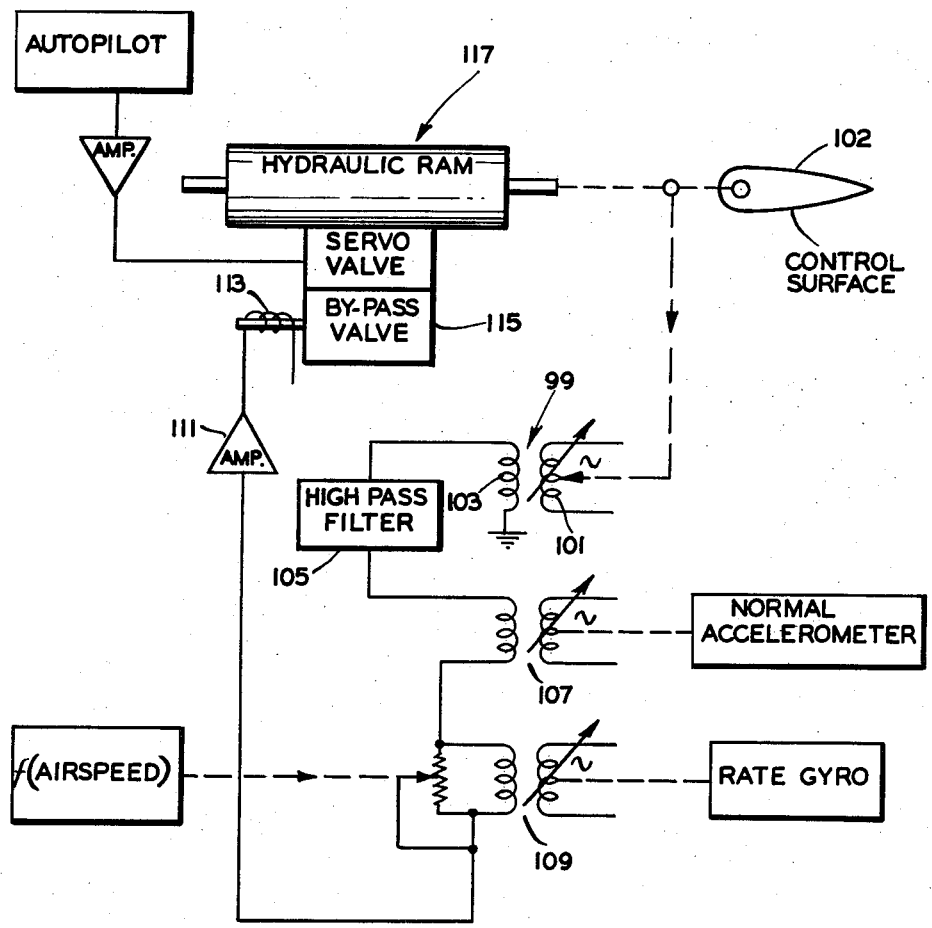

In FIGURE 4, a follow-up inductive device 99 has its rotor 101 drivably connected to control surface 102. Signals corresponding to displacement of the control surface from a predetermined position are induced in stator 103 of inductive device 99 and the signals are applied to a high pass filter 105 which provides either rate or acceleration signals depending on the time constant of the filter. The filtered signals are added algebraically to normal acceleration signals from inductive device 107 and rate of turn signals from inductive device 109. The signal sum is amplified by amplifier 111 and energizes solenoid 113 of by-pass valve 115 to render servomotor 117 ineffective to operate control surface 102. The filtered follow-up signals anticipate dangerous accelerations of the craft in that the follow-up signals correspond to movement of control surface 102 and servomotor 117 is rendered ineffective to operate control surface 102 before the craft attains dangerous accelerations.

Figure 5:
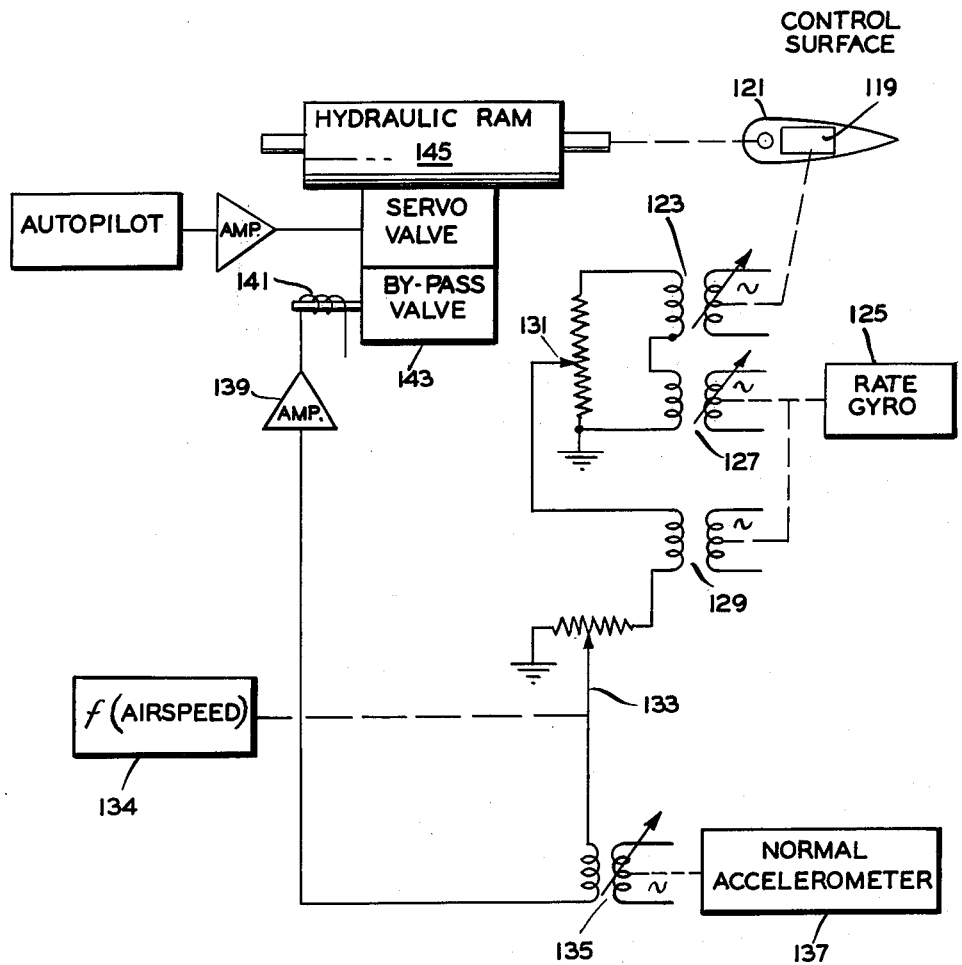

In FIGURE 5, a rate gyro 119 is associated with control surface 121 as by mounting the rate gyro within the control surface so that the rate gyro is responsive to movement of the control surface. Rate gyro 119 operates an inductive device 123 to provide signals corresponding to rate of movement of the control surface. A rate gyro 125 is mounted in the craft to detect rate of turn of the craft about the control axis and operates inductive devices 127 and 129 to provide rate of turn signals corresponding to rate of turn of the craft about the control axis. The signals from inductive device 127 are combined with the signals from inductive device 123 and the combined signals are modulated by a potentiometer 131 to any suitable extent and the modulated signal is combined algebraically with the rate signal from inductive device 129. The signal sum is further modulated as a function of airspeed by a device 134 operating a potentiometer 133. The modulated signal from potentiometer 133 is added algebraically with a normal acceleration signal from inductive device 135 controlled by normal accelerometer 137 and the signal sum is amplified by amplifier 139 and energizes solenoid 141 of by-pass valve 143. When the amplified signal attains a predetermined amplitude sufficient to operate the by-pass valve, hydraulic ram 145 is rendered ineffective to operate control surface 121. In this embodiment rate gyro 119 detects movement of control surface 121 and the load limiter renders hydraulic ram 145 ineffective to operative control surface 121 before the craft attains dangerous accelerations.

The load limiter described herein and constructed according to the invention renders the servo motor ineffective to operate the control surface before the craft attains dangerous accelerations by responding to signals corresponding to movement of the control surface to anticipate any dangerous accelerations of the craft. The load limiter is highly responsive, simple in design and readily adapted to aircraft of modern design.

While several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A load limiter for aircraft having a control surface for controlling the craft about an axis, comprising driving means responsive to commands for operating the control surface, means for providing signals corresponding to normal acceleration of the craft, means for providing signals corresponding to rate of movement of the control surface, means for combining the signals and means responsive to the combined signals for rendering the driving means ineffective to operate the control surface in response to commands when the combined signals attain a predetermined amplitude.

2. A load limiter for aircraft having a control surface for controlling the craft about an axis, comprising driving means responsive to commands for operating the control surface, means for providing signals corresponding to the rate of movement of the control surface, and means responsive to the signals for rendering the driving means ineffective to operate the control surface in response to commands when the signals attain a predetermined amplitude.

3. A load limiter for aircraft having a control surface for controlling the craft about an axis, comprising driving means responsive to commands for operating the control surface, means for providing signals corresponding to acceleration of the control surface, and means responsive to the signals for rendering the driving means ineffective to operate the control surface in response to commands when the signals attain a predetermined amplitude.

4. A load limiter for aircraft having a control surface for controlling the craft about an axis, comprising driving means responsive to commands for operating the control surface, means for providing signals corresponding to rate of turn of the craft about the axis, means for providing signals corresponding to movement of the control surface, and means for combining the signals and for rendering the driving means ineffective to operate the control surface in response to commands when the combined signals attain a predetermined amplitude.

5. A load limiter for aircraft having a control surface for controlling the craft about an axis, comprising driving means responsive to commands for operating the control surface, means for providing signals corresponding to rate of turn of the craft about the axis, means for providing signal corresponding to movement of the control surface, means for providing signals corresponding to normal acceleration of the craft, and menas for combining the signals and for rendering the driving means ineffective to operate the control surface in response to commands when the combined signals attain a predetermined amplitude.

6. A load limiter for aircraft having a control surface for controlling the craft about an axis, comprising a servomotor responsive to commands for operating the control surface, a rate generator drivably connected to said servomotor and providing signals corresponding to rate of movement of the control surface, and means responsive to the signals for rendering the servomotor ineffective to operate the control surface in response to commands when the signals attain a predetermined amplitude.

7. A load limiter for aircraft having a control surface for controlling the craft about an axis, comprising a servomotor responsive to commands for operating the control surface, means for providing signals corresponding to rate of turn of the craft about the axis, a rate generator drivably connected to said servomotor and providing signals corresponding to rate of movement of the control surface, and means for combining the signals and for rendering the servomotor ineffective to operate the control surface in response to commands when the combined signals attain a predetermined amplitude.

8. A load limiter for aircraft having a control surface for controlling the craft about an axis, comprising a servomotor responsive to commands for operating the control surface, means for providing signals corresponding to rate of turn of the craft about the axis, means for varying the rate of turn signals as a function of airspeed, a rate generator drivably connected to said servomotor and providing signals corresponding to rate of movement of the control surface, and means for combining the signals and for rendering the servomotor ineffective to operate the control surface in response to commands when the combined signals attain a predetermined amplitude.

9. A load limiter for aircraft having a control surface for controlling the craft about an axis, comprising a servomotor responsive to commands for operating the control surface, means for providing signals corresponding to rate of turn of the craft about the axis, means for providing signals corresponding to normal acceleration of the craft, a rate generator drivably connected to said servomotor and providing signals corresponding to rate of movement of the control surface, and means for combining the signals and for rendering the servomotor ineffective to operate the control surface in response to commands when the combined signals attain a predetermined amplitude.

10. A load limiter for aircraft having a control surface for controlling the craft about an axis, comprising control means, driving means responsive to the control means for operating the control surface, means responsive to the control means for providing signals corresponding to a derivative of movement of the control surface, and means responsive to the signals for rendering the driving means ineffective to operate the control surface in response to the control means when the signals attain a predetermined amplitude.

11. A load limiter for aircraft having a control surface for controlling the craft about an axis, comprising control means for providing command signals, driving means responsive to the signals from the control means for operating the control surface, a high pass filter connected to the control means and filtering the signals therefrom, and means responsive to the filtered signals for rendering the driving means ineffective to operate the control surface in response to the signals from the control means when the filtered signals attain a predetermined amplitude.

12. A load limiter for aircraft having a control surface for controlling the craft about an axis, comprising control means, driving means responsive to the control means for operating the control surface, means for providing signals corresponding to rate of turn of the craft about the axis, means responsive to the control means for providing signals corresponding to movement of the control surface, and means for combining the signals and for rendering the driving means ineffective to operate the control surface in response to the control means when the combined signals attain a predetermined amplitude.

13. A load limiter for aircraft having a control surface for controlling the craft about an axis, comprising control means, driving means responsive to the control means for operating the control surface, means for providing signals corresponding to rate of turn of the craft about the axis, means for varying the rate of turn signals as a function of airspeed, means responsive to the control means for providing signals corresponding to movement of the control surface, and means for combining the signals and for rendering the driving means ineffective to operate the control surface in response to the control means when the combined signals attain a predetermined amplitude.

14. A load limiter for aircraft having a control surface for controlling the craft about an axis, comprising control means, driving means responsive to the control means for operating the control surface, means for providing signals corresponding to rate of turn of the craft about the axis, means for providing signals corresponding to normal acceleration of the craft, means responsive to the control means for providing signals corresponding to movement of the control surface, and means for combining the signals and for rendering the driving means ineffective to operate the control surface in response to the control means when the combined signals attain a predetermined amplitude.

15. A load limiter for aircraft having a control surface for controlling the craft about an axis, comprising control means, driving means responsive to the control means for operating the control surface, means for providing signals corresponding to rate of turn of the craft about the axis, means for providing signals corresponding to normal acceleration of the craft, a high pass filter connected to the control means and filtering the signal therefrom for providing signals corresponding to rate of movement of the control surface, and means for combining the rate of turn signals, the acceleration signals and the filtered signals and for rendering the driving means ineffective to operate the control surface in response to the control means when the combined signals attain a predetermined amplitude.

16. A load limiter for aircraft having a control surface for controlling the craft about an axis, comprising hydraulic means responsive to commands for operating the control surface, a pressure transducer responsive to hydraulic pressure of said hydraulic means for providing signals corresponding to movement of the control surface, and means responsive to the signals for rendering the hydraulic means ineffective to operate the control surface in response to commands when the signals attain a predetermined amplitude.

17. A load limiter for aircraft having a control surface for controlling the craft about an axis, comprising hydraulic means responsive to commands for operating the control surface, means for providing signals corresponding to rate of turn of the craft about the axis, a pressure transducer responsive to hydraulic pressure of said hydraulic means for providing signals corresponding to movement of the control surface, and means for combining the signals and for rendering the hydraulic means ineffective to operate the control surface in response to commands when the combined signals attain a predetermined amplitude.

18. A load limiter for a having a control surface for controlling the craft about an axis, comprising hydraulic means responsive to commands for operating the control surface, means for providing signals corresponding to rate of turn of the craft about the axis, means for varying the rate of turn signals as a function of airspeed, a pressure transducer responsive to hydraulic pressure of said hydraulic means for providing signals corresponding to movement of the control surface, and means for combining the signals and for rendering the hydraulic means ineffective to operate the control surface in response to commands when the combined signals attain a predetermined amplitude.

19. A load limiter for aircraft having a control surface for controlling the craft about an axis, comprising hydraulic means responsive to commands for operating the control surface, means for providing signals corresponding to rate of turn of the craft about the axis, means for providing signals corresponding to normal acceleration of the craft, a pressure transducer responsive to hydraulic pressure of said hydraulic means for providing signals corresponding to movement of the control surface, and means for combining the signals and for rendering the hydraulic means ineffective to operate the control surface in response to commands when the combined signals attain a predetermined amplitude.

20. A load limiter for aircraft having a control surface for controlling the craft about an axis, comprising driving means responsive to commands for operating the control surface, a follow-up device drivably connected to said control surface for providing signals corresponding to movement of the control surface, means connected to the follow-up device and receiving the signals and providing signals corresponding to rate of movement of the control surface, and means connected to said last named means and responsive to the rate signals for rendering the driving means ineffective to operate the control surface in response to commands when the rate signals attain a predetermined amplitude.

21. A load limiter for aircraft having a control surface for controlling the craft about an axis, comprising driving means responsive to commands for operating the control surface, a follow-up device drivably connected to said control surface for providing signals corresponding to movement of the control surface, a high pass filter connected to said follow-up device and filtering the signals therefrom, and means responsive to the filtered signals for rendering the driving means ineffective to operate the control surface in response to commands when the filtered signals attain a predetermined amplitude.

22. A load limiter for aircraft having a control surface for controlling the craft about an axis, comprising driving means responsive to commands for operating the control surface, means for providing signals corresponding to the rate of turn of the craft about the axis, a follow-up device drivably connected to said control surface for providing signals corresponding to movement of the control surface, and means for combining the signals and for rendering the driving means ineffective to operate the control surface in response to commands when the signals attain a predetermined amplitude.

23. A load limiter for aircraft having a control surface for controlling the craft about an axis, comprising driving means responsive to commands for operating the control surface, means for providing signals corresponding to the rate rate of turn of the craft about the axis, means for varying the rate of turn signals as a function of air speed, a follow-up device drivably connected to said control surface for providing signals corresponding to movement of the control surface, and means for combining the signals and for rendering the driving means ineffective to operate the control surface in response to commands when the combined signals attain a predetermined amplitude.

24. A load limiter for aircraft having a control surface for controlling the craft about an axis, comprising driving means responsive to commands for operating the control surface, means for providing signals corresponding to rate of turn of the craft about the axis, means for providing signals corresponding to normal acceleration of the craft, a follow-up device drivably connected to said control surface for providing signals corresponding to movement of the control surface, and means for combining the signals and for rendering the driving means ineffective to operate the control surface in response to commands when the combined signals attain a predetermined amplitude.

25. A load limiter for aircraft having a control surface for controlling the craft about an axis, comprising driving means responsive to commands for operating the control surface, means for providing signals corresponding to rate of turn of the craft about the axis, means for varying the rate of turn signals as a funtcion of airspeed, means for providing signals corresponding to normal acceleration of the craft, a follow-up device drivably connected to said control surface for providing signals corresponding to movement of the control surface, a high pass filter connected to said follow-up device and filtering the signal therefrom, and means for combining the rate signals, acceleration signals and filtered signals and for rendering the driving means ineffective to operate the control surface in response to commands when the combined signals attain a predetermined amplitude.

26. A load limiter for aircraft having a control surface for controlling the craft about an axis, comprising driving means responsive to commands for operating the control surface, means associated with said control surface for providing signals corresponding to rate of movement of the control surface, and means responsive to the signals for rendering the driving means ineffective to operate the control surface in response to commands when the signals attain a predetermined amplitude.

27. A load limiter for aircraft having a control surface for controlling the craft about an axis, comprising driving means responsive to commands for operating the control surface, means for providing signals corresponding to rate of turn of the craft about the axis, means associated with said control surface for providing signals corresponding to rate of movement of the control surface, and means for combining the signals and for rendering the driving means ineffective to operate the control surface in response to commands when the combined signals attain a predetermined amplitude.

28. A load limiter for aircraft having a control surface for controlling the craft about an axis, comprising driving means responsive to commands for operating the control surface, means for providing signals corresponding to rate of turn of the craft about the axis, means for varying the rate of turn signals as a funtcion of airspeed, means associated with said control surface for providing signals corresponding to rate of movement of the control surface, and means for combining the signals and for rendering the driving means ineffective to operate the control surface in response to commands when the combined signals attain a predetermined amplitude.

29. A load limiter for aircraft having a control surface for controlling the craft about an axis, comprising driving means responsive to commands for operating the control surface, means for providing signals corresponding to rate of turn of the craft about the axis, means for providing signals corresponding to normal acceleration of the craft, means associated with said control surface for providing signals corresponding to rate of movement of the control surface, and means for combining the signals and for rendering the driving means ineffective to operate the control surface in response to commands when the combined signals attain a predetermined amplitude.

30. A load limiter for aicraft having a control surface for controlling the craft about an axis, comprising driving means responsive to commands for operating the control surface, means associated with the control surface for providing signals corresponding to rate of movement of the control surface, means for providing signals corresponding to rate of turn of the craft about the axis, means for combining the control surface rate signal and the craft rate of turn signal and for modifying the signals as a function of airspeed, means for providing signals corresponding to normal acceleration of the craft, and means for combining the modified signals and the acceleration signals and for rendering the driving means ineffective to operate the control surface in response to commands when the comibned signals attain a predetermined amplitude.

References Cited in the file of this patent
UNITED STATES PATENTS

| | | |
|---|---|---|
| 2,663,001 | Rusler | Dec. 15, 1953 |
| 2,665,086 | Moog et al. | Jan. 5, 1954 |
| 2,770,429 | Schuck et al. | Nov. 13, 1956 |
| 2,859,005 | Owen et al. | Nov. 4, 1958 |
| 2,879,958 | Buxton | Mar. 31, 1959 |